United States Patent Office 3,324,119
Patented June 6, 1967

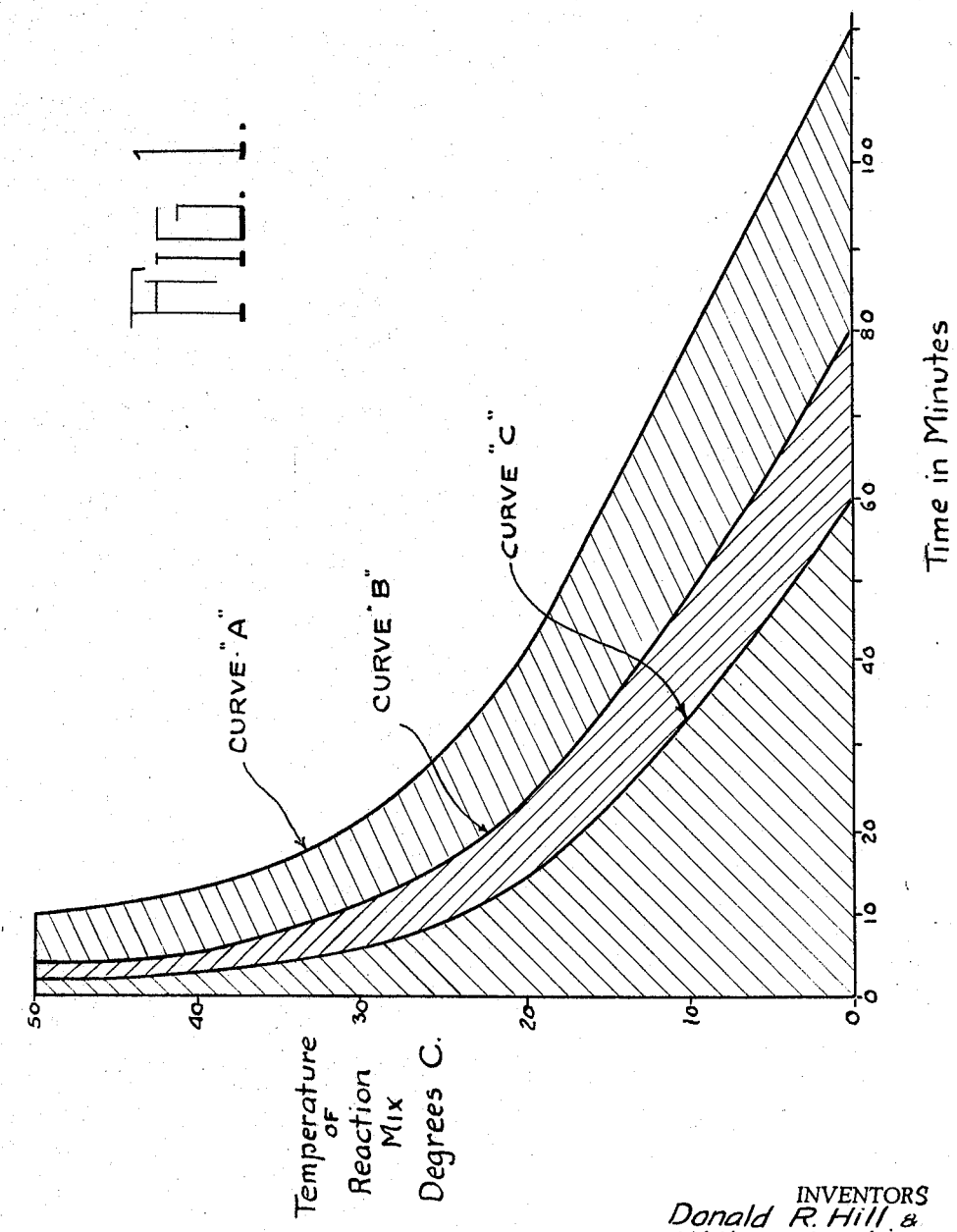

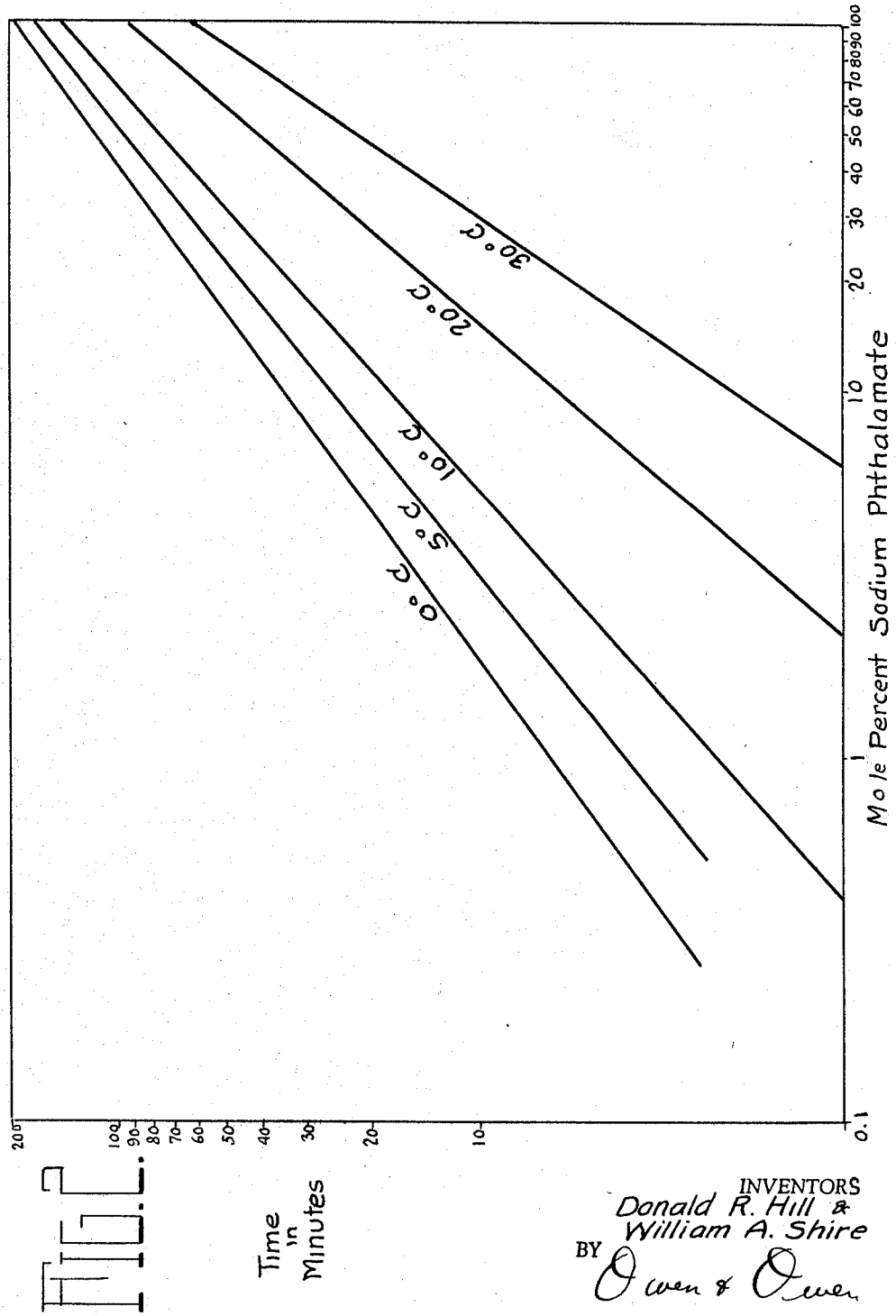

3,324,119
PRODUCTION OF ISATOIC ANHYDRIDE AND CERTAIN HALO DERIVATIVES THEREOF
Donald R. Hill and William A. Shire, Cincinnati, Ohio, assignors to Maumee Chemical Company, Toledo, Ohio, a corporation of Ohio
Filed Dec. 23, 1963, Ser. No. 332,808
9 Claims. (Cl. 260—244)

This is a continuation-in-part of application Ser. No. 782,293, filed Dec. 22, 1958.

This invention relates to the production of isatoic anhydride or of any of certain halo derivatives thereof, and more particularly, to an improved method for producing such a compound by a controlled reaction between a phtalimide or a halo phthalimide-salt and a metal hypohalite.

Isatoic anhydride has heretofore been produced commercially in Germany by a reaction which is understood to require the use of phosgene ($COCl_2$). The anhydride is useful as an intermediate for the production of anthranilic acid esters which are perfume essences and flavoring materials. It has also been suggested that isatoic anhydride can be produced from phthalimide, sodium hydroxide, sodium- or calcium-hypochlorite and an acid.[1] The reaction involving these starting materials, which can also be used to produce anthranilic acid, however, is said to be erratic, producing dark colored crude isatoic anhydride in yields which vary for no apparent reason, the highest yield reported to have been achieved being about 80 percent; the lowest was zero.

The present invention is based upon the discovery that isatoic anhydride and certain halo derivatives thereof can be produced, and in high and controlled yields, from phthalimide or one of certain halo derivatives thereof, sodium hydroxide, sodium hypochlorite, water and an acid.

It is, therefore, an object of the invention to provide an improved method for producing isatoic anhydride or one of certain halo derivatives thereof.

It is a further object of the invention to provide a controlled method for reacting a compound having the formula

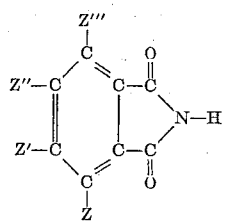

where Z, Z', Z" and Z'" can be —H or halo, a material reactive therewith to produce a water-soluble salt of the compound, water, a metal hypohalite and an acid reacting substance, to produce, in high yield, a substance having the formula

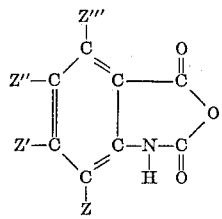

where Z, Z', Z" and Z'" have the indicated meaning.

In the attached drawings, FIG. 1 is a plot of maximum time after mixing phthalimide or a halo derivative thereof, water and an alkali, and before addition of a hypohalite to the mixture versus temperature thereof in producing an acid anhydride according to the invention, and FIG. 2 is a plot showing percent hydrolysis of sodium phthalimide to sodium phthalamate as a function of time, and at several different temperatures.

According to the invention, a compound having the formula

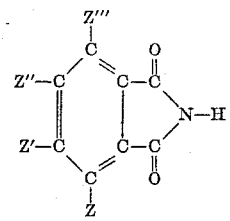

wherein Z, Z', Z" and Z'" represent —H or halo, and a substantially equivalent proportion of a material[2] reactive therewith to produce a water-soluble salt of the compound are mixed with a quantity of water, at a temperature not higher than about 45° C., which quantity is at least sufficient to essentially dissolve the salt. Not more than X minutes after the mixing of the compound, the material and the water, a quantity ranging, per mole of the compound, from 0.9 equivalent to 1.08 equivalents of a metal hypohalite[3] is added to the resulting solution, X being a function of the temperature of the mixture of the compound, the material and the water, and being represented by one of the curves of FIG. 1 of the attached drawings. When the exothermic heat of reaction between the salt of the compound and the hypohalite has released, per gram mole of the compound, from 18,000 to 30,000 gram calories, the solution is adjusted to and maintained at a pH of from 5.5 to 9.0 assuming that the total heat released, when the reaction is carried out adiabatically, is the volume, in cc., of the reaction mixture times the temperature rise thereof in degrees C. Specifically, this pH adjustment is made at an intermediate point in the reaction, when substantially all of the phthalimide or equivalent has reacted at least as far as a particular intermediate, but before more than about 20 percent thereof has reacted as far as the sodium salt of isatoic anhydride or equivalent. Preferably, the adjustment is to a pH from 6 to 7.5, and, most desirably, to one from 6.4 to 6.8.

The following specific description, which illustrates the best presently known modes for practicing the instant invention, provides a basis for an explanation of the criticality of the limitations set forth in the preceding paragraph.

*Example 1*

A one liter beaker was charged with 364 cc. of a water solution containing 12.09 grams of sodium hydroxide, and at a temperature of 20° C. The solution in the beaker was stirred by a propeller-type agitator during the rapid addition of 43.61 grams of phthalimide, and throughout the remaining steps in the preparation. The temperature of the reaction mixture was held at 20° C. for 2½ minutes after completion of the charging of the phthalimide; a 300 cc. portion of sodium hypochloride[4] solution at 20° C.

---

[1] See Mohr Journal für praktische Chemie (2), 80, 1–33.

[2] Usually an oxide or hydroxide of lithium, potassium, sodium, magnesium or calcium, or a carbonate of lithium, potassium, or sodium, any of which is operable, as well as metallic lithium, potassium, sodium or calcium.

[3] Usually a lithium-, potassium-, sodium-, calcium- or magnesium-hypochlorite or hypobromite, any of which is operable.

[4] The sodium hypochlorite solution was prepared by reacting 21.0 grams of chlorine with 24.0 grams of sodium hydroxide in sufficient water to produce 300 cc. of solution at 20° C.

was then added thereto. When exothermic reaction had generated 6600 gram calories, as indicated by the reaction mixture reaching a temperature of 30° C., a total of 8.05 cc. of 36.4 N sulfuric acid was added thereto as required to bring the pH thereof to, and to maintain it at, 6.9. The first sulfuric acid addition was made approximately 20 seconds after the sodium hypochlorite was charged and the adjustment required several seconds. Crude isatoic anhydride was then recovered by filtration of the slurry, washed with water, and dried for 15 hours in an oven at 50–60° C. The total recovery amounted to 45.3 grams, or 93.6 percent of theory. The material was light tan in color and assayed 99.8 percent.

The procedure described above has also been modified by varying the time interval between the addition of phthalimide to the sodium hydroxide solution and the addition of the sodium hypochlorite solution, while otherwise completely reproducing the procedure. It has been found that the yield of crude isatoic anhydride depends upon the length of this time interval. The results of this series of tests are presented in tabular form, below:

TABLE I

| Time interval, minutes: | Percent yield of isatoic anhydride |
| --- | --- |
| 2.5 | 93.6 |
| 10.0 | 90.6 |
| 40.0 | 80.5 |

It is known that anthranilic acid can be produced from the reactants used in the foregoing procedure. The following reaction mechanism has been suggested.[5]

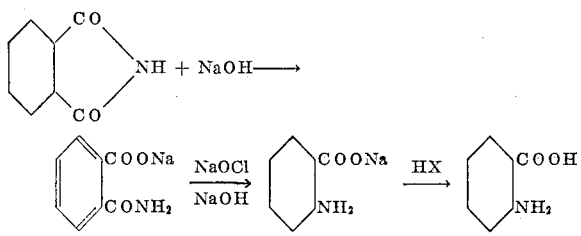

It is possible to demonstrate the production, as suggested by the foregoing equations, of sodium phthalamate:

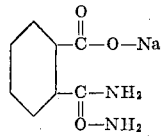

when phthalimide is dissolved in a water solution of sodium hydroxide. To demonstrate such hydrolysis, a solution is prepared from distilled water at a pH of from 7.0 to 7.2, sodium hydroxide, and phthalimide. The solution is held at a fixed temperature for a definite time and is then poured into a water-acid solution containing one equivalent of acid per equivalent of sodium hydroxide used in the phthalimide solution. The resulting mixture is then back titrated with standard caustic to a pH of from 7.0 to 7.2. The number of moles of sodium hydroxide required for the back titration equals the number of moles of phthalimide hydrolyzed, and the phthalimide remaining unhydrolyzed is a precipitate which can be separated and determined quantitatively. Such tests have been carried out, and, on the basis of these tests, it has been determined that the hydrolysis of sodium phthalimide to sodium phthalamate occurs, in solution, and that the rate at which such hydrolysis occurs is a direct function of temperature. It has also been determined that the extent to which such hydrolysis proceeds prior to the addition of sodium hypochlorite solution thereto governs the percent yield of the crude isatoic anhydride produced by the procedures summarized in Table I, above. Also, within the limits with respect to proportions of reactants which are

[5] Conant: The Chemistry of Organic Compounds, The Macmillan Company, New York, N.Y., 1939, page 420.

feasible for use in the production of isatoic anhydride by the method of the invention, temperature is the principal factor which governs the rate at which sodium phthalimide is hydrolyzed to sodium phthalamate. For example, a solution of sodium phthalimide can stand for approximately 35 minutes at 0° C. before 10 percent of the sodium phthalimide is hydrolyzed to sodium phthalamate, but 10 percent is hydrolyzed to sodium phthalamate in approximately 2 minutes at 30° C. The results of these tests are summarized graphically for solution temperatures of 0° C., 5° C., 10° C., 20° C. and 30° C. by the curves of FIG. 2 which are plots of mole percent of sodium phthalamate versus time for the indicated temperatures.

By careful investigation it has been determined that, for the production of isatoic anhydride, in high yields, by reactions of the type indicated, not more than 50 percent of the sodium phthalimide should be hydrolyzed to sodium phthalamate before sodium hyprochlorite or its equivalent is added thereto to initiate the reactions by which the desired anhydride is ultimately formed. Curve A of the plot of FIG. 1 of the attached drawings represents the time, as a function of temperature, required for 50 percent of the sodium phthalimide in such a solution to hydrolyze to sodium phthalamate. In accordance with the invention, therefore, sodium hyprochlorite or its equivalent is added to such a solution not more than X minutes after addition of phthalimide to a sodium hydroxide solution where X is a function of the temperature of the solution, and is represented by curve A of the drawing. Preferably, X is not greater than the time represented by curve B of the drawing, which is similar to curve A, but shows the relationships for 30 percent hydrolysis, and, most desirably, X is not greater than the time represented by curve C of the drawing which shows the relationships for 20 percent hydrolysis. If either heating or cooling is used before the hyprochlorite addition, a mean effective time X not longer than indicated should be used.

Preventing hydrolysis of sodium phthalimide by adding sodium hypochlorite quickly to the reaction mix produced from water, phthalimide and sodium hydroxide does not necessarily assure a good yield of isatoic anhydride. This point has been demonstrated by still another series of tests in which the procedure described in Example 1, above, was repeated, except that the sulfuric acid was added to the reaction products at a different stage, either earlier or later. Data concerning this series of tests is summarized in Table II, below:

TABLE II

| Heat of reaction before acid addition (gram calories/gram mole[6]): | Percent yield of isatoic anhydride |
| --- | --- |
| 12,000 | Reaction uncontrollable; product not isatoic anhydride. |
| 22,100 | 93.6. |
| 26,400 | 87.5. |
| 77,000[7] | 25.0. |

[6] Volume of reaction mixture, in cc., times temperature rise in degrees C.
[7] No mineral acid was added in this test; pH was lowered by an acid formed in the reaction mixture.

It will be appreciated that the procedure which has been described above is adiabatic in nature, provided that incidental heat transfer between the reaction mixture and the surroundings is ignored. Since, in an adiabatic reaction, the final reaction temperature is a direct function of the amount of heat evolved by an exothermic reaction, as is the production of isatoic anhydride or the like in accordance with the invention, certain conclusions can be drawn from the data presented in Table II, above. Isatoic anhydride, or a salt thereof, is an intermediate product in a series of reactions which commences when sodium hypochlorite is added to a solution of sodium phthalimide. Adding sulfuric acid to the reaction mixture, to control pH as indicated in the procedure of Example 1, causes the series of reactions to stop, however, so that isatoic anhydride can be recovered in a high yield. By correlating the conditions employed for the reactions with the time at which sulfuric acid or an equivalent is added to the reaction mixture, an optimum yield of isatoic anhydride can be achieved.

Carefully controlled tests have been carried out to demonstrate that a pH adjustment of the reaction mixture with sulfuric acid or an equivalent should be commenced when exothermic heat of reaction between sodium hypochlorite and the water solution of sodium phthalimide and sodium phthalamate controlled in accordance with the data shown in FIG. 1, has released, per gram mole of phthalimide charged, from 18,000 to 30,000 gram calories. Preferably the acid is added to the reaction mixture when the exothermic heat of reaction has released from 20,000 to 28,000 gram calories per gram mole of phthalimide charged. Using the procedure of Example 1 hereof, and adjusting the pH with sulfuric acid on the preferred basis indicated in this paragraph, at least an 85 percent yield of isatoic anhydride is achieved. Even if it were possible, taking into account the rapidly changing chemical composition of the reaction mixture, to determine the specific heat, or a mean effective specific heat, of the reaction mixture, and then to determine accurately the amount of heat released by the exothermic reaction, such refinement is not essential in ascertaining when the pH adjustment should be started in producing an anhydride according to the invention. It is known that the reaction mixture is composed of water and of various salts, and in proportions, in any case, which can be readily determined experimentally, or which can be calculated, if desired. Addition of a sulfuric acid or equivalent solution, should be started in the procedure described above, when the temperature rise of the reaction mixture indicates the release of at least 18,000 and preferably, for optimum results, at least 20,000, gram calories per gram mole of phthalimide charged, assuming that the total amount of heat released is the total volume, in cc., of the reaction mixture times the temperature rise in degrees C. Similarly, sulfuric or an equivalent acid should be added, in such procedure, when the temperature rise of the reaction mixture indicates the release of not more than 30,000, and preferably, for optimum results, not more than 28,000, gram calories per gram mole of phthalimide charged, again assuming that the total amount of heat released is the total volume, in cc., of the reaction mixture times the temperature rise in degrees C.

It has been ascertained that when a pH adjustment is made as discussed above only a minor portion, not more than about 20 percent, of the phthalimide or equivalent has reacted as far as the sodium salt of isatoic anhydride or equivalent. Accordingly, the pH adjustment is made not to stop the reaction, but to control the major part of the rearrangement. Specifically, the pH adjustment should be made only after substantially all of the phthalimide or equivalent has been reacted at least as far as N-chlorophthalamic acid, and should be to a pH sufficiently high to maintain therein both the monosodium salt and the disodium salt of N-chlorophthalamic acid, but sufficiently low to convert substantially all of the sodium salt of isatoic anhydride in the reaction mixture to isatoic anhydride.

It will be appreciated that making an adjustment of a reaction mixture to a pH of about 6.9, as in the procedure described above in Example 1, requires several seconds, and that a reaction which releases 6600 gram calories in about twenty seconds, and by the reaction of approximately ⅓ gram mole portions of materials, is proceeding at an extremely rapid rate. It has been ascertained that the reaction can be controlled more readily by adding about 75 percent of the acid theoretically required to neutralize the sodium hydroxide or equivalent in the reaction mixture, and by making such addition slightly later in the reaction, and substantially instantaneously. For example, substantially the same, or slightly improved, results can be achieved if the procedure of Example 1 is repeated, except that 75 percent of the sulfuric acid theoretically required to neutralize the sodium hydroxide in the reaction mixture is added thirty seconds after the sodium hypochlorite addition, and, thereafter, further pH adjustments are made as required to maintain a pH of approximately 6.9.

The following experimental procedure has been carried out to demonstrate the mechanism by which isatoic anhydride or an equivalent therefor is produced according to the method of the invention.

*Example 2*

The procedure described in Example 1 was repeated, except that, thirty seconds after the sodium hypochlorite addition, a 6.04 cc. portion of 36.4 N sulfuric acid was added substantially instantaneously to the reaction mixture, followed immediately by about 300 grams of chopped ice. The beaker was then surrounded with chopped ice, and the reaction mixture was stirred vigorously to effect rapid cooling to about 0° C. A small quantity of a white precipitate was observed in the reaction mixture, and was subsequently identified as isatoic anhydride. This precipitate was separated from the mother liquor by filtration, washed, dried and weighed. The recovery amounted to about 4 grams, or slightly less than 10 percent of theory. Care was taken during filtration of the isatoic anhydride to prevent warming of the mother liquor. Thereafter, the mother liquid was allowed to warm to a temperature in the range of 15 to 20° C., and periodic additions of sulfuric acid were made, as required, to maintain a pH of about 6.9. During a period of a few minutes a further precipitate formed. This precipitate, which was subsequently identified as isatoic anhydride, was separated by filtration, washed, dried, and combined with the first precipitate. The combined isatoic anhydride fractions were then weighed, and found to amount to 45 grams, or 93 percent of theory.

The procedure described in the preceding paragraph has also been repeated except that, after filtration of the first isatoic anhydride fraction therefrom, the mother liquor was acidified to a pH of about 3. A substantial precipitate formed, and was identified as N-chlorophthalamic acid after filtration, washing and drying. A portion of the N-chlorophthalamic acid was subsequently mixed with water, and the water was adjusted and maintained at a pH of approximately 6.9 at about 20° C. The N-chlorophthalamic acid dissolved, and white isatoic anhydride then precipitated.

It will be apparent from Example 2, above, that, as has been previously indicated, the pH adjustment which is made according to the process of the instant invention is for the purpose of controlling the major part of a molecular rearrangement which ultimately produces isatoic anhydride rather than for the purpose of stopping reaction. It has been determined from appropriate titration curves that both the mono- and di-sodium salts of N-chlorophthalamic acid exist, in solution, at pH's below the minimum at which sodium isatoic anhydride exists. Since isatoic anhydride itself is substantially insoluble in water, the pH adjustment according to the invention, made as previously discussed, causes neutralization of the sodium isatoic anhydride which had formed prior to the pH adjustment, as well as precipitation of the isatoic anhydride formed, and maintaining the pH within such range as reaction proceeds causes precipitation of subsequently formed isatoic anhydride. This precipitation effectively prevents undesired side reactions which occur if the pH adjustment is not made, or if the pH is not maintained within the operable range subsequent to the adjustment.

It has also been determined that the disodium salt of N-chlorophthalamic acid will undergo molecular rearrangement to form the sodium salt of isatoic anhydride but that the monosodium salt of N-chlorophthalamic acid will not undergo such rearrangement. Accordingly, the effectiveness of the instant method depends upon the previously unknown facts that the sodium salt of isatoic anhydride does not exist at pH's within the previously indicated range, that the mono- and di-sodium salts of N-chlorophthalamic acid do exist within such range, that the disodium salt of N-chlorophthalamic acid will undergo molecular rearrangement to the sodium salt of isatoic anhydride, at pH's within such range, and that, in undergoing such rearrangement, each molecule of the disodium salt of N-chlorophthalamic acid releases a sodium cation which converts a molecule of the monosodium salt of N-chlorophthalamic acid to the disodium salt thereof.

The production of isatoic anhydride or the like, in accordance with the invention, has heretofore been discussed with reference to an essentially adiabatic reaction. Such a reaction is preferred from some standpoints, particularly because the course thereof can be followed by simple temperature measurements, so that control is comparatively easy. However, the reaction mixture can be either heated or cooled, if desired, and throughout all or any portion thereof. Since, as has been demonstrated above, the extent to which sodium phthalimide or the like is hydrolyzed to sodium phthalamate or the like should be minimized in order to obtain an optimum yield of an acid anhydride, and since elevated temperatures favor such hydrolysis, there is ordinarily no reason to supply heat to the solution prepared from phthalimide or a halogenated phthalimide, sodium hydroxide or an equivalent and water. In fact, a comparatively low temperature is advantageous, so that any heat transfer is preferably from the solution, but high temperatures can be tolerated. Similarly, after addition of sodium hypochlorite or an equivalent, comparatively low temperatures would be expected to favor the progression of the exothermic reactions, and any heat transfer is preferably from the reaction mixture, but comparatively high temperatures can be tolerated, and heat can actually be supplied to the reaction mixture, if desired, provided that the reactions are stopped at the proper time, determined as indicated above.

The following example illustrates the production of a chloro isatoic anhydride from the corresponding chloro phthalimide.

*Example 3*

A 200 milliliter beaker was charged with 79 cc. of water at a temperature of 20° C., and 2.04 grams of sodium hydroxide. The water in the beaker was stirred by a propeller-type agitator during the rapid addition of a 9.07 gram portion of mixed, monochloro phthalimide isomers, and throughout the remaining steps in the preparation. The temperature of the reaction mixture was held at 20° C. for 2.0 minutes after completion of the charging of the chloro phthalimide isomers; a 50 cc. portion of the sodium hypochlorite solution described in Example 1 was then added thereto. When 1160 gram calories were released as indicated by the reaction mixture's reaching a temperature of 29° C., a 40 cc. portion of 9.76 N hydrochloric acid was added as required to bring the pH thereof to, and maintain it at 7.2, and crude chloro isatoic anhydride

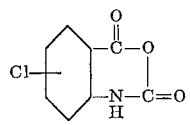

was then recovered by filtration of the slurry which formed. The crude anhydride was washed with water and dried for 15 hours in an oven at 50–60° C. The total recovery amounted to 10.08 grams, or 102 percent of theory. The material was light tan in color, and had a melting point, with decomposition, of 160–178° C., and was indicated by infrared absorption to be a chloro isatoic anhydride.

The procedure described in Example 1, above, can be repeated, substituting equivalent amounts of a carbonate of Li, K, or Na, a hydroxide of Li, K, Mg or Ca, or an oxide of Li, K, Na, Mg or Ca, or metallic Li, K, Na or Ca for the sodium hydroxide, and, also, substituting equivalent amounts of a hypochlorite of Li, K, Mg or Ca or of a hypobromite of Li, K, Na, Mg or Ca for the sodium hypochlorite. In all cases, results substantially equivalent with those of the example can be achieved. It is apparent, therefore, that any compound reactive with phthalimide or a halo derivative thereof to produce a water-soluble salt can be used in place of sodium hydroxide, and that any metal hypohalite, preferably any hypochlorite, can be used in place of the sodium hypochlorite in producing an acid anhydride according to the invention. A substantially equivalent proportion of the material which is reactive with phthalimide or a halo phthalimide should be used to produce the water-soluble salt thereof, i.e., from 0.95 equivalent thereof to 1.05 equivalents thereof, per mole of the phthalimide or chloro phthalimide. Similarly, from 0.9 equivalent to 1.08 equivalents of the metal hypohalite should be used per mole of phthalimide or its equivalent. The function of the sulfuric acid in the foregoing procedures is merely to reduce the pH of the reaction mixture, whereby high yields of isatoic anhydride or its equivalent are achieved. The chemical identity of the acid is in no way involved, and substantially the same results are achieved using any desired acid, provided that the pH is adjusted to and maintained within the range of 9.0–5.5. Alkali metal hydroxides, most desirably sodium hydroxide, alkali metal hypochlorites, most desirably sodium hypochlorite, and sulfuric acid, as used in the procedure of Example 1, are preferred reactants because of their ready availability and comparatively low cost.

Isatoic anhydride or any of certain halo derivatives thereof, as defined above, can be produced in accordance with the invention by either continuous or batchwise operations. As will be apparent to one skilled in the art, various changes and modifications can be made from the specific procedures set forth above without departing from the spirit and scope of the attached claims.

What we claim is:

1. A method for producing isatoic anhydride which comprises mixing phthalimide and a substantially equimolecular proportion of sodium hydroxide with a quantity of water, at a temperature not higher than about 30° C., at least sufficient to dissolve sodium phthalimide which is formed, adding, per mole of phthalimide, and not more than X minutes after the mixing of the phthalimide, the sodium hydroxide and the water, from 0.9 mole to 1.08 moles of sodium hypochlorite to the resulting solution, where X is a function of the temperature of the mixture of phthalimide, sodium hydroxide and water, and is represented by curve C of FIG. 1 of the attached drawings, and adjusting the solution to and maintaining it at a pH sufficiently low to convert substantially all of the sodium salt of isatoic anhydride therein to isatoic anhydride but sufficiently high to maintain therein both the monosodium salt and the disodium salt of N-chlorophthalamic acid when substantially all of the phthalimide in the reaction mixture has been reacted at least as far as N-chlorophthalamic acid salts, but before more than about 20 percent thereof has been reacted as far as the sodium salt of isatoic anhydride.

2. A method for producing isatoic anhydride which comprises mixing phthalimide and a substantially equimolecular proportion of a material reactive therewith to produce a water-soluble metal salt of phthalimide with a quantity of water, at a temperature not higher than about 30° C., at least sufficient to dissolve the phthalimide salt which is formed, adding, per mole of phthalimide, and not more than X minutes after the mixing of the phthalimide, the material and the water, from 0.9 mole to 1.08 moles of a metal hypohalite to the resulting solution, where X is a function of the temperature of the mixture of phthalimide, the material and water, and is represented by curve C of FIG. 1 of the attached drawings, and adjusting the solution to and maintaining it at a pH between 5.5 and 9, inclusive, sufficiently low to convert substantially all of the isatoic anhydride salt therein to isatoic anhydride but sufficiently high to maintain therein both the mono-salt and the di-salt of N-chlorophthalamic acid when substantially all of the phthalimide in the reaction mixture has been reacted at least as far as N-chlorophthalamic acid salts, but before more than about 20 percent thereof has been reacted as far as the isatoic anhydride salt.

3. A method for producing an isatoic anhydride which comprises mixing a compound having the formula

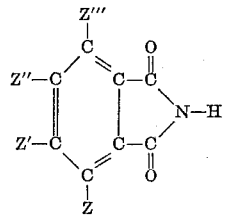

wherein each of the symbols Z, Z′, Z″ and Z‴ represents a member of the group consisting of —H and halo and a substantially equivalent proportion of a material reactive therewith to produce a water-soluble salt of the compound with a quantity of water, at a temperature not higher than about 30° C., at least sufficient to dissolve the salt, adding, per mole of the compound, and not more than X minutes after the mixing of the compound, the material and the water, from 0.9 equivalent to 1.08 equivalents of a metal hypochlorite to the resulting solution, where X is a function of the temperature of the compound, the material and the water, and is represented by curve C of FIG. 1 of the attached drawings, and adjusting the solution to and maintaining it at a pH between 5.5 and 9.0, inclusive, sufficiently low to convert substantially all of the salt of the anhydride therein to free anhydride but sufficiently high to maintain therein both the mono-salt and the di-salt of an N-chloro-acid having the formula

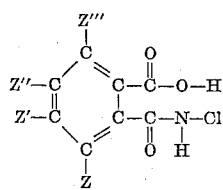

when substantially all of the compound in the reaction mixture has been reacted at least as far as the N-chloro-acid salts, but before more than about 20 percent thereof has been reacted as far as the anhydride salt.

4. A method for producing an isatoic anhydride which comprises mixing a compound having the formula

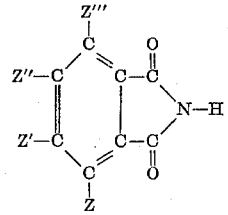

wherein each of the symbols Z, Z′, Z″ and Z‴ represents a member of the group consisting of —H and halo and a substantially equivalent proportion of a material reactive therewith to produce a water-soluble salt of the compound with a quantity of water, at a temperature not higher than about 40° C., at least sufficient to dissolve the salt, adding, per mole of the compound, and not more than X minutes after the mixing of the compound, the material and the water, from 0.9 equivalent to 1.08 equivalents of a metal hypochlorite to the resulting solution, where X is a function of the temperature of the mixture of the compound, the material and the water, and is represented by curve B of FIG. 1 of the attached drawings, and adjusting the solution to and maintaining it at a pH between 5.5 and 9.0, inclusive, sufficiently low to convert substantially all of the salt of the anhydride therein to free anhydride but sufficiently high to maintain therein both the mono-salt and the di-salt of an N-chloro-acid having the formula

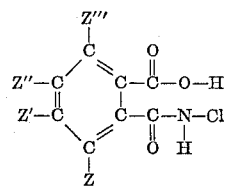

when substantially all of the compound in the reaction mixture has been reacted at least as far as the N-chloro-acid salts, but before more than about 20 percent thereof has been reacted as far as the anhydride salt.

5. A method for producing an isatoic anhydride which comprises mixing a compound having the formula

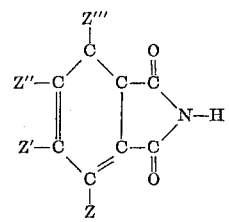

wherein each of the symbols Z, Z′, Z″ and Z‴ represents a member of the group consisting of —H and halo and a substantially equivalent proportion of a material reactive therewith to produce a water-soluble salt of the compound with a quantity of water, at a temperature not higher than about 45° C., at least sufficient to dissolve the salt, adding, per mole of the compound, and not more than X minutes after the mixing of the compound, the material and the water, from 0.9 equivalent to 1.08 equivalents of a metal hypochlorite to the resulting solution, where X is a function of the temperature of the mixture of the compound, the material and the water, and is represented by curve A of FIG. 1 of the attached drawings, and adjusting the solution to and maintaining it at a pH between 5.5 and 9.0, inclusive, sufficiently low to convert substantially all of the salt of the anhydride therein to free anhydride but sufficiently high to maintain therein both the mono-salt and the di-salt of an N-chloro-acid having the formula

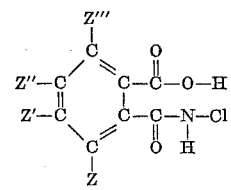

when substantially all of the compound in the reaction mixture has been reacted at least as far as the N-chloro-acid salts, but before more than about 20 percent thereof has been reacted as far as the anhydride salt.

6. A method of producing an isatoic anhydride which comprises mixing a compound having the formula

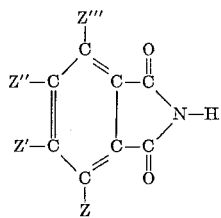

wherein each of the symbols Z, Z', Z" and Z''' represents a member of the group consisting of —H and halo and a substantially equivalent proportion of a material reactive therewith to produce a water-soluble salt of the compound with a quantity of water at least sufficient to dissolve the salt, adding, per mole of the compound, and at a time when at least 50 percent of the salt remains in an unhydrolyzed condition and has not been converted to the corresponding phthalamate salt, from 0.9 equivalent to 1.08 equivalents of a metal hypohalite to the resulting solution, and adjusting the solution to and maintaining it at a pH between 5.5 and 9.0, inclusive, sufficiently low to convert substantially all of the salt of the anhydride therein to free anhydride but sufficiently high to maintain therein both the mono-salt and the di-salt of an N-chloro-acid having the formula

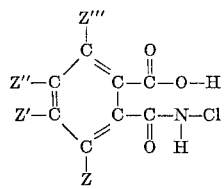

when substantially all of the compound in the reaction mixture has been reacted at least as far as the N-chloro-acid salts, but before more than about 20 percent thereof has been reacted as far as the anhydride salt.

7. A method for producing isatoic anhydride which comprises mixing phthalimide and a substantially equimolecular proportion of a material reactive therewith to produce a water-soluble alkali metal salt of phthalimide with a quantity of water at least sufficient to dissolve the salt, adding, per mole of the compound, and not more than X minutes after the mixing of the compound, the material and the water, from 0.9 mole to 1.08 moles of an alkali metal hypochlorite to the resulting solution, where X is a function of the temperature of the mixture of phthalimide, the material and the water, and is represented by curve B of FIG. 1 of the attached drawings, and adjusting the solution to and maintaining it a pH between 5.5 and 9.0, inclusive, sufficiently low to convert substantially all of the isatoic anhydride salt therein to free anhydride but sufficiently high to maintain therein both the mono- and di-salts of N-chlorophthalamic acid when substantially all of the phthalimide in the reaction mixture has been reacted at least as far as N-chlorophthalamic acid salts, but before more than about 20 percent thereof has been reacted as far as the isatoic anhydride salt.

8. A method for producing an isatoic anhydride which comprises mixing a compound having the formua

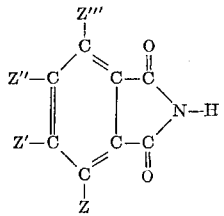

wherein each of the symbols Z, Z', Z" and Z''' represents a member of the group consisting of —H and halo and a substantially equivalent proportion of a material reactive therewith to produce a water-soluble salt of the compound with a quantity of water at least sufficient to dissolve the salt, adding, per mole of the compound, and not more than X minutes after the mixing of the compound, the material and the water, from 0.9 equivalent to 1.08 equivalents of a metal hypohalite to the resulting solution, where X is a function of the temperature of the mixture of the compound, the material and the water, and is represented by curve B of FIG. 1 of the attached drawings, and adjusting the solution to and maintaining it at a pH between 5.5 and 9.0, inclusive, sufficiently low to convert substantially all of the salt of the anhydride therein to free anhydride but sufficiently high to maintain therein both the mono-salt and the di-salt of an N-chloro-acid having the formula

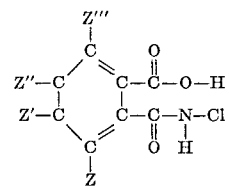

when substantially all of the compound in the reaction mixture has been reacted at least as far as the N-chloro-acid salts, but before more than about 20 percent thereof has been reacted as for the anhydride salt.

9. A method for producing isatoic anhydride which comprises mixing phthalimide and a substantially equimolecular proportion of sodium hydroxide with a quantity of water at least sufficient to dissolve sodium phthalimide which is formed, adding, per mole of phthalimide, and not more than X minutes after the mixing of the phthalimide, the sodium hydroxide and the water, from 0.9 mole to 1.08 moles of sodium hypochlorite to the resulting solution, where X is a function of the temperature of the mixture of phthalimide, sodium hydroxide and water, and is represented by curve C of FIG. 1 of the attached drawings, and adjusting the solution to and maintaining it at a pH between 5.5 and 9.0, inclusive, sufficiently low to convert substantially all of the isatoic anhydride salt therein to free anhydride but sufficiently high to maintain therein both the mono- and di-salts of N-chlorophthalamic acid when substantially all of the phthalimide in the reaction mixture has been reacted at least as far at N-chlorophthalamic acid salts, but before more than about 20 percent thereof has been reacted as far as the isatoic anhydride salt.

References Cited
FOREIGN PATENTS
127,138   3/1901   Germany.

OTHER REFERENCES
Mohr: "J. Prakt. Che." Band 80, pp. 1–33 (1909).
Adams et al.: JACS, vol. 60, pp. 1411–15 (1938).

WALTER A. MODANCE, *Primary Examiner.*

R. BOND, *Assistant Examiner.*

UNITED STATES PATENT OFFICE
CERTIFICATE OF CORRECTION

Patent No. 3,324,119                          June 6, 1967

Donald R. Hill et al.

It is hereby certified that error appears in the above numbered patent requiring correction and that the said Letters Patent should read as corrected below.

Column 1, line 71, for "SO" read -- 80 --; column 2, line 64, for "hypochloride" read -- hypochlorite --; column 3, lines 32 to 49, the formula should appear as shown below instead of as in the patent:

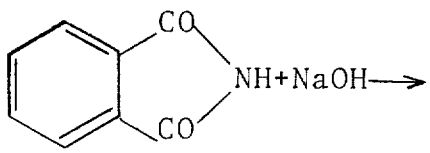

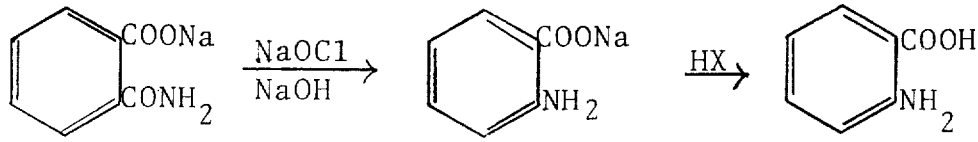

It is possible to demonstrate the production, as suggested by the foregoing equations, of sodium phthalamate:

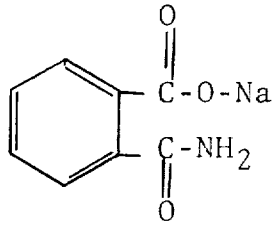

column 4, lines 18, 36, 40 and 75, for "hyprochlorite", each occurrence, read -- hypochlorite --; column 5, lines 41 and 49, and column 7, line 48, for "cc.", each occurrence, read -- cc's --; column 7, lines 63 to 69, the formula should appear as shown below instead of as in the patent:

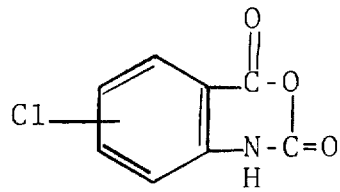

column 10, lines 29 to 41, the formula should appear as shown below instead of as in the patent:

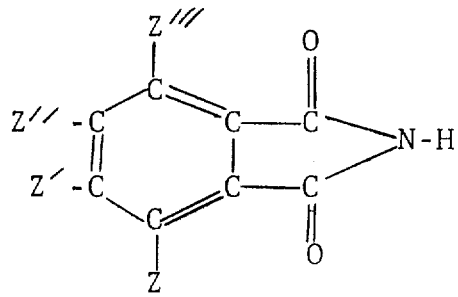

column 11, line 66, for "formua" read -- formula --; column 12, lines 19 to 29, the formula should appear as shown below instead as in the patent:

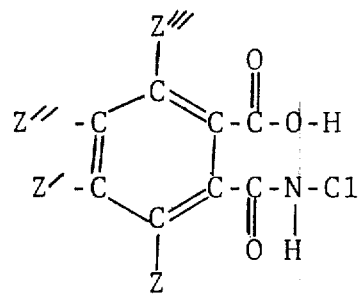

line 33, for "for" read -- far as --; same column 12, line 52, for "at" read -- as --.

Signed and sealed this 8th day of April 1969.

(SEAL)
Attest:

EDWARD M. FLETCHER, JR.
Attesting Officer

EDWARD J. BRENNER
Commissioner of Patents